United States Patent [19]
Kato

[11] Patent Number: 6,041,674
[45] Date of Patent: Mar. 28, 2000

[54] STRUCTURE FOR CONTROLLING THE DISPLACEMENT OF A PEDAL FOR A VEHICLE

[75] Inventor: Yoshihisa Kato, Aichi-ken, Japan

[73] Assignee: Toyota Jidosha Kabushiki Kaisha, Toyota, Japan

[21] Appl. No.: 08/988,006

[22] Filed: Dec. 10, 1997

[30] Foreign Application Priority Data

Dec. 25, 1996 [JP] Japan ..................................... 8-346348

[51] Int. Cl.⁷ .............................. G05G 1/14; B60K 28/14
[52] U.S. Cl. ............................................. 74/512; 180/274
[58] Field of Search ............................... 74/512; 180/274, 180/275; 280/748, 784; 296/189

[56] References Cited

U.S. PATENT DOCUMENTS

| | | | |
|---|---|---|---|
| 5,778,732 | 7/1998 | Patzelt et al. | 74/512 |
| 5,848,558 | 12/1998 | Isono et al. | 74/512 |
| 5,848,662 | 12/1998 | Sakaue | 180/274 |

FOREIGN PATENT DOCUMENTS

| | | | |
|---|---|---|---|
| C2 2841988 | 4/1980 | Germany. | |
| 3533-420 | 3/1987 | Germany | 74/512 |
| 39 04 616 A1 | 8/1989 | Germany | 74/512 |
| 43 05 290 A1 | 9/1993 | Germany | 74/512 |
| 1-73464 U | 5/1989 | Japan. | |
| 8-175346 | 9/1996 | Japan | 74/512 |
| 2 031 814 | 4/1980 | United Kingdom | 74/512 |

*Primary Examiner*—David A. Bucci
*Assistant Examiner*—William C Joyce
*Attorney, Agent, or Firm*—Oliff & Berridge, PLC

[57] ABSTRACT

A structure for controlling the displacement of a pedal for a vehicle includes: a pedal bracket whose front end side is coupled to a first vehicle body-side component member, and whose rear end side is coupled to a second vehicle body-side component member; a suspended-type pedal for a vehicle whose rotating shaft portion serving as a center of swinging motion is supported by the pedal bracket; and a sliding and guiding surface for causing the pedal bracket to be rotatively displaced substantially toward a front side of the vehicle in a side view by causing the rear end side of the pedal bracket to be displaced substantially toward a lower side of the vehicle when the external force is applied, wherein the pedal bracket is coupled to the first vehicle body-side component member in such a manner as to be rotatable about the front end side thereof substantially in a vertical direction of the vehicle. Accordingly, when an external force of a predetermined value or greater is applied to the front of the vehicle, rotative displacement acting substantially toward the front side of the vehicle occurs in the pedal bracket, thereby making it possible to provide control such that the stepping surface of the pedal for a vehicle is displaced substantially toward the front side of the vehicle.

4 Claims, 12 Drawing Sheets

F I G. 2
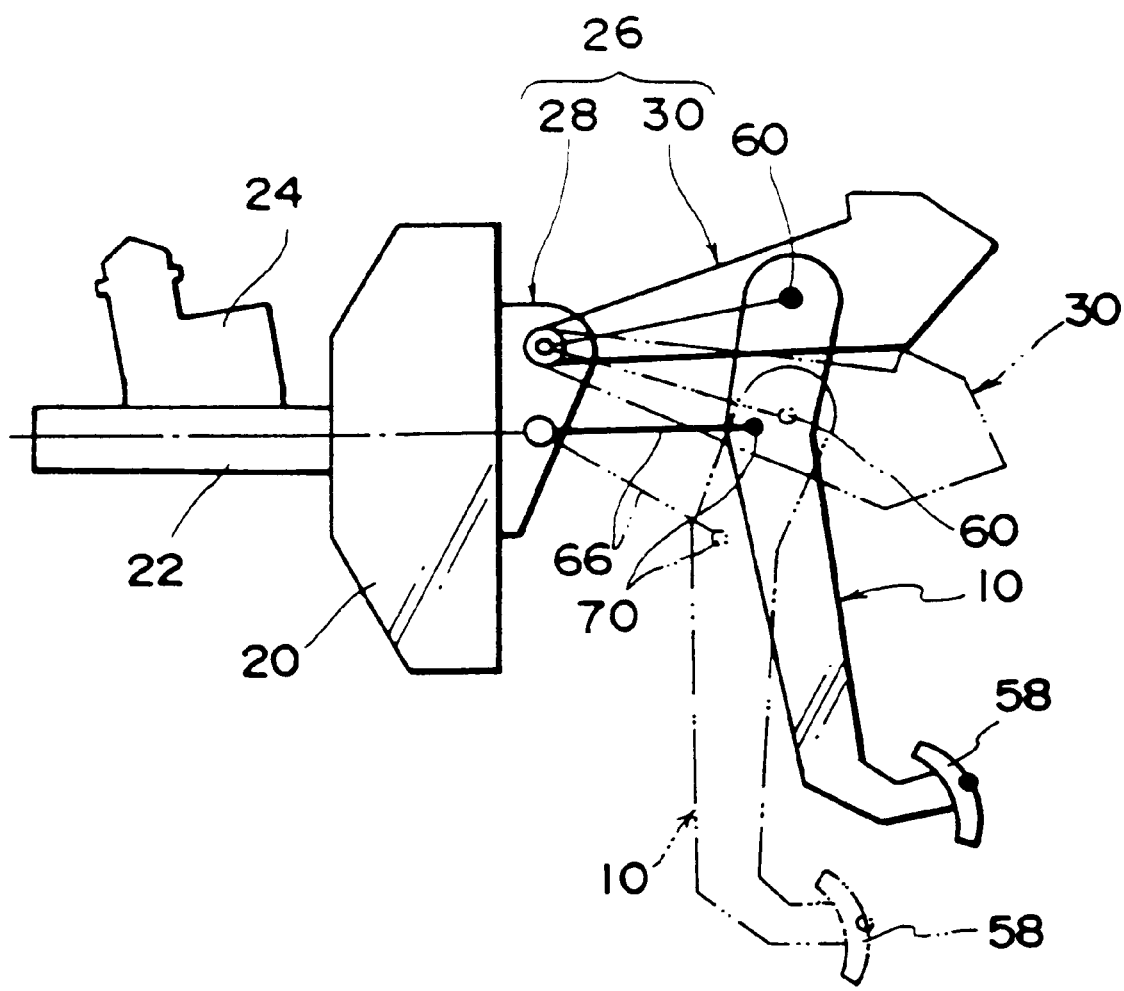

F I G. 3
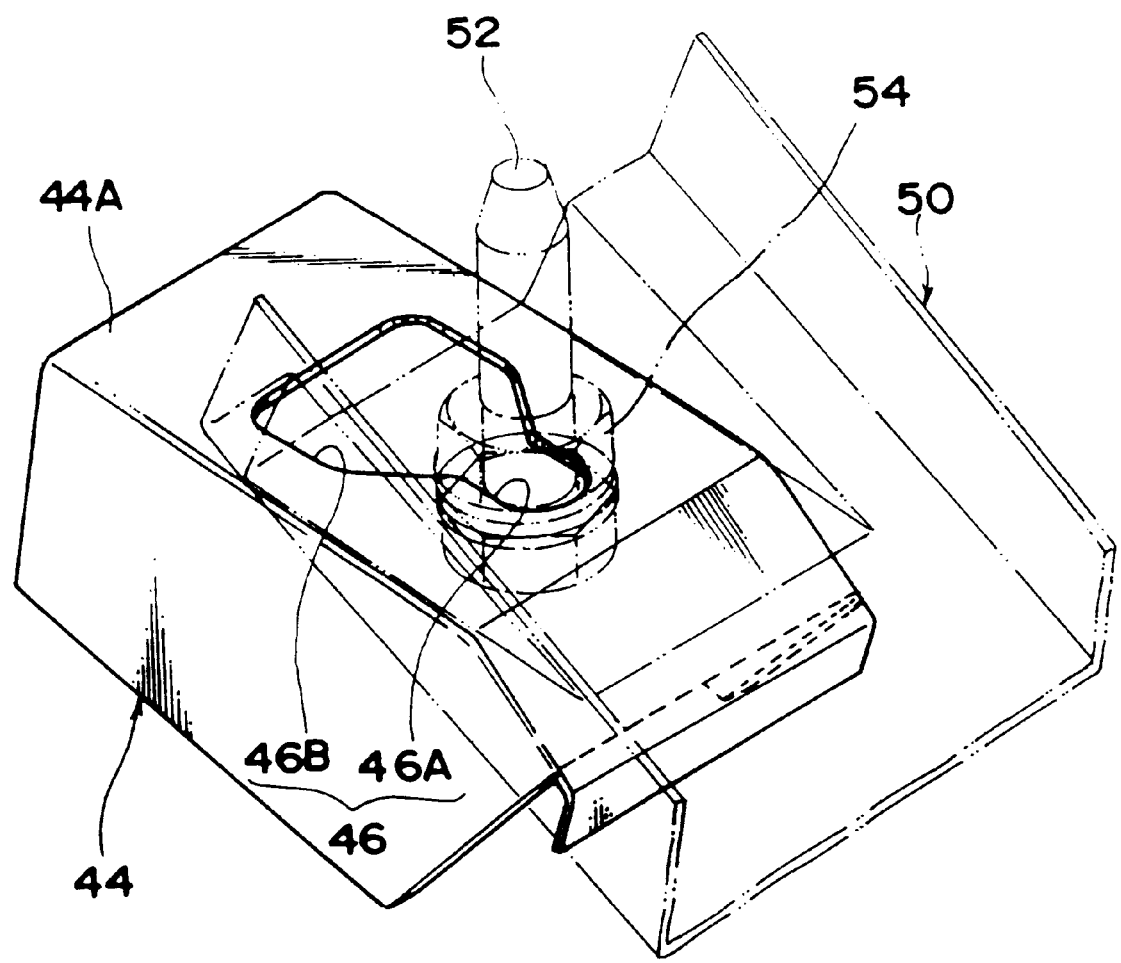

F I G. 5
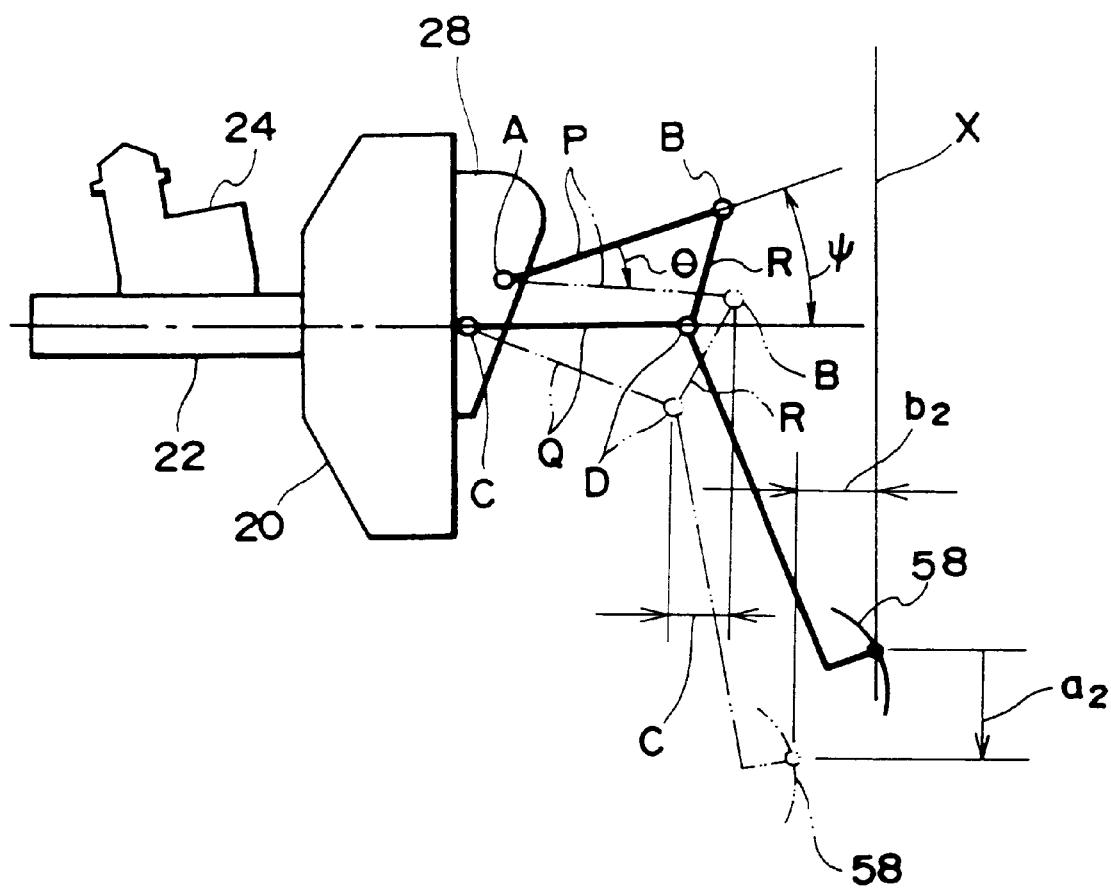

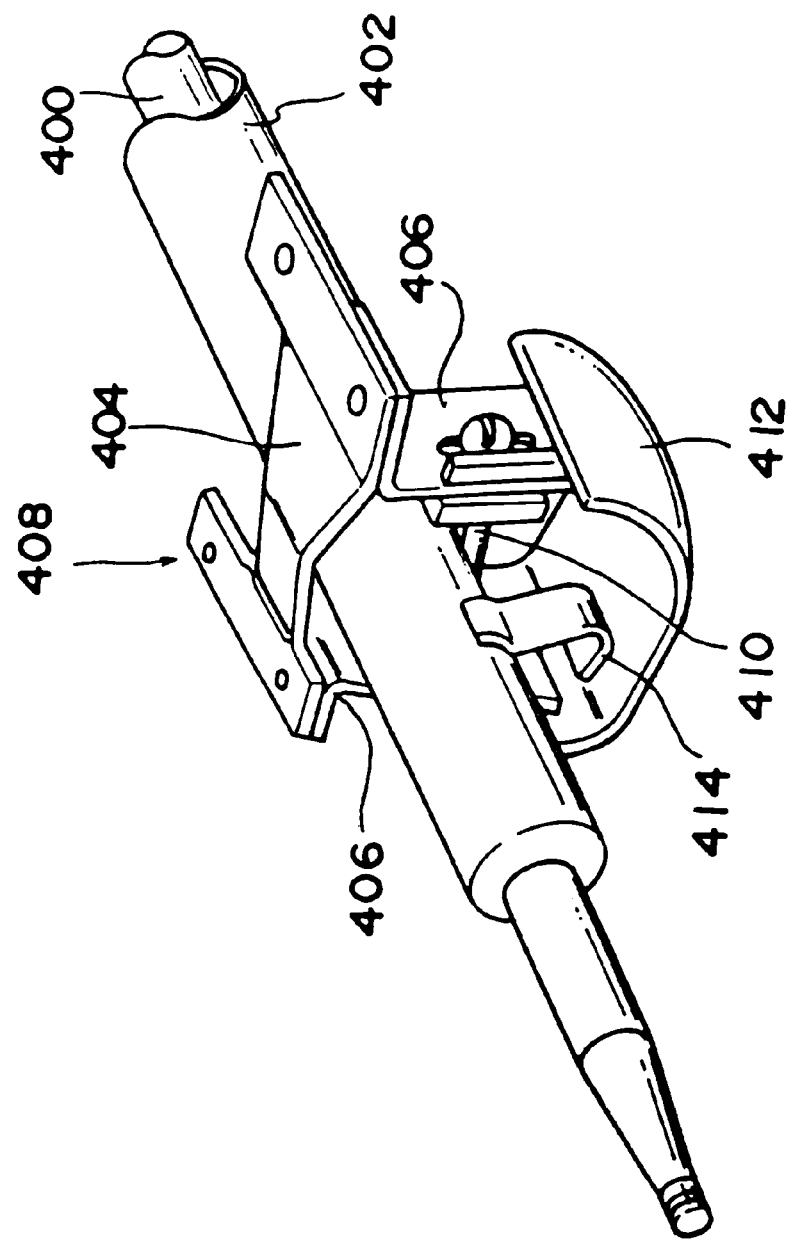

STRUCTURE FOR CONTROLLING THE DISPLACEMENT OF A PEDAL FOR A VEHICLE

BACKGROUND OF THE INVENTION

1. Field of the Invention

The present invention relates to a structure for controlling the displacement of a pedal for a vehicle.

2. Description of the Related Art

Hitherto, various structures have been devised as countermeasures at the time an external force of a predetermined value or greater is applied from the forward direction of a vehicle. As an example of this type of countermeasure, it is possible to cite the structure disclosed in Japanese Patent Utility Model Application Laid-Open (JP-U) No. 1-73464.

To give a brief description, as illustrated in FIG. 12, in the structure disclosed in this publication, a steering column 402 which covers a steering shaft 400 is supported at a vehicle body by a tilt bracket 408, which is formed from an upper plate member 404 and a pair of side plate members 406, and by a shaft 410, which passes through the side plate members 406 and supports the bottom end of the steering column 402.

A knee protector 412, which is shaped as a substantially circular arc-shaped surface and is elastically deformable, is disposed at the lower side of the tilt bracket 408. The knee protector 412 is elastically supported at the lower side of the steering column 402 via elastically deformable stays 414.

In accordance with the above structure, when an external force of a predetermined value or greater is applied from the forward direction of the vehicle, the vehicle occupant starts to inertially move toward the front of the vehicle, and accordingly, the knees of the vehicle occupant start to inertially move in the same direction while the knees of the vehicle occupant are bent as the starting point of bending. Therefore, if the knee protector 412 were not provided, the driver's knees might contact the tilt bracket 408. However, if the knee protector 412 is disposed beneath the tilt bracket 408 as described above, the driver's knees only contact the knee protector 412.

This structure in which the knee protector 412 is provided is useful as a countermeasure at the time that an external force of a predetermined value or greater is applied from the forward direction of the vehicle. However, countermeasures for protecting the legs of the vehicle occupant can also be studied from other points of view. Further, to provide such countermeasures in the relationship with the legs of the vehicle occupant in a multifaceted manner is important from the standpoint of multiple protection.

The present inventors conceived of the idea of the present invention from this standpoint, conducted various experiments and arrived upon extremely effective countermeasures which control the displacement of a pedal for a vehicle such as a brake pedal at the time that an external force of a predetermined value or greater is applied from the forward direction of the vehicle, by focusing on the deformation and the displacement behavior of the body panel and the like at the time such an external force is applied.

SUMMARY OF THE INVENTION

In view of the aforementioned, an object of the present invention is to provide a structure for controlling the displacement of a pedal for a vehicle which can control the displacement of a stepping surface of a pedal for a vehicle at the time that an external force of a predetermined value or greater is applied from the forward direction of the vehicle.

To this end, in accordance with a first aspect of the present invention, there is provided a structure for controlling the displacement of a pedal for a vehicle, comprising: a pedal bracket whose front end side is coupled to a first vehicle body-side component member which is displaced substantially toward a rear side of the vehicle when an external force of a predetermined value or greater is applied to a front of the vehicle, and whose rear end side is coupled to a second vehicle body-side component member which is disposed more substantially on a vehicle rear side than the first vehicle body-side component member and substantially does not undergo displacement substantially toward the rear side of the vehicle even if the external force is applied; a suspended-type pedal for a vehicle whose rotating shaft portion serving as a center of swinging motion is supported by the pedal bracket; and guiding means for causing the pedal bracket to be rotatively displaced substantially toward a front side of the vehicle in a side view by causing the rear end side of the pedal bracket to be displaced substantially toward a lower side of the vehicle when the external force is applied, wherein the pedal bracket is coupled to the first vehicle body-side component member in such a manner as to be rotatable about the front end side thereof substantially in a vertical direction of the vehicle.

In accordance with a second aspect of the present invention, in the structure for controlling the displacement of a pedal for a vehicle according to the first aspect of the invention, the length of a segment which connects a point of coupling of the front end side of the pedal bracket to the first vehicle body-side component member and the rotating shaft portion is set to be longer than the length of rotation of transmitting means which is coupled to a vicinity of an intermediate portion of the pedal for a vehicle and is adapted to transmit a stepping force imparted to a stepping surface of the pedal for a vehicle to a master cylinder for conversion to hydraulic pressure.

In accordance with a third aspect of the present invention, in the structure for controlling the displacement of a pedal for a vehicle according to the first or second aspect of the invention, a segment which connects a point of coupling of the front end side of the pedal bracket to the first vehicle body-side component member and the rotating shaft portion is set to be inclined substantially toward the lower side of the vehicle in a direction substantially toward a front side of the vehicle with respect to transmitting means which is coupled to a vicinity of an intermediate portion of the pedal for a vehicle and is adapted to transmit a stepping force imparted to a stepping surface of the pedal for a vehicle to a master cylinder for conversion to hydraulic pressure.

In accordance with a fourth aspect of the present invention, the structure for controlling the displacement of a pedal for a vehicle according to any one of the first to third aspects of the invention further comprises: urging means for urging the rear end side of the pedal bracket in a direction in which the rear end side of the pedal bracket receives a displacing force oriented substantially toward the lower side of the vehicle.

In accordance with the first aspect of the present invention, when the external force of the predetermined value or greater is applied to the front portion of the vehicle, the first vehicle body-side component member is displaced substantially toward the rear side of the vehicle. For this reason, the pedal bracket whose rear end side is coupled to the first vehicle body-side component member is also displaced substantially in the same direction, and the rear end side of the pedal bracket is displaced substantially toward the lower side of the vehicle while being guided by the guiding means. Rotative displacement acting substantially toward the front side of the vehicle in a side view occurs in the pedal bracket. Hence, the stepping surface of the suspended-type pedal for a vehicle whose rotating shaft portion is supported by the pedal bracket is also displaced substantially toward the front side of the vehicle. Namely, in accordance with the present invention, when an external force of a predetermined value or greater is applied to the front of the vehicle, rotative displacement acting substantially toward the front side of the vehicle occurs in the pedal bracket, thereby making it possible to provide control such that the stepping surface of the pedal for a vehicle is displaced substantially toward the front side of the vehicle.

Further, in the present invention, since the pedal bracket is coupled to the first vehicle body-side component member in such a manner as to be rotatable about the front end side thereof substantially in the vertical direction of the vehicle, the reaction against the downward displacement acting on the guiding means from the rear end side of the pedal bracket becomes small.

In accordance with the second aspect of the present invention, as a new component member, the transmitting means, which is coupled to a vicinity of an intermediate portion of the pedal for a vehicle and is adapted to transmit a stepping force imparted to the stepping surface of the pedal for a vehicle to a master cylinder for conversion to hydraulic pressure, is added to the component elements in the first aspect of the invention. In accordance with the present invention, since the length of a segment which connects a point of coupling of the front end side of the pedal bracket to the first vehicle body-side component member and the rotating shaft portion serving as a center of swinging motion of the pedal for a vehicle is set to be longer than the length of rotation of the transmitting means, the radius of rotation of the transmitting means which is shorter becomes smaller. Accordingly, as compared with a case in which the lengths of the two members are set to be equal, if the angle of rotation is identical, it is possible to increase the distance in the substantially longitudinal direction of the vehicle between the rotating shaft portion and the point of coupling of the transmitting means to the pedal for a vehicle.

As will also be referred to in the description of the embodiments which will be given later, the "length of rotation" referred to herein, in short, means the length of a portion which rotates when the transmitting means receives a displacement force acting substantially toward the lower side of the vehicle.

In accordance with the third aspect of the present invention, since the segment which connects the point of coupling of the front end side of the pedal bracket to the first vehicle body-side component member and the rotating shaft portion serving as the center of swinging motion of the pedal for a vehicle is set to be inclined substantially toward the lower side of the vehicle in a direction substantially toward the front side of the vehicle with respect to the transmitting means, it is possible to offset the center of rotation of the aforementioned segment (i.e., the point of coupling of the front end side of the pedal bracket to the first vehicle body-side component member) toward the transmitting means (substantially toward the lower side of the vehicle). Accordingly, as compared with a case in which the aforementioned segment and the longitudinal direction of the transmitting means are disposed in parallel with each other, if the angle of rotation is identical, it is possible to increase the distance in the substantially longitudinal direction of the vehicle between the rotating shaft portion and the point of coupling of the transmitting means to the pedal for a vehicle.

In accordance with the fourth aspect of the present invention, an urging force is applied to the rear end side of the pedal bracket by the urging force of the urging means in the direction in which the rear end side of the pedal bracket receives a displacing force oriented substantially toward the lower side of the vehicle. Hence, the reaction against the downward displacement acting on the guiding means from the rear end side of the pedal bracket becomes even smaller than in the case of the first aspect of the present invention.

As described above, the structure for controlling the displacement of a pedal for a vehicle in accordance with the first aspect of the invention is arranged such that the pedal bracket is rotatively displaced substantially toward the front side of the vehicle in a side view by causing the rear end side of the pedal bracket to be displaced substantially toward the lower side of the vehicle by the guiding means when an external force of a predetermined value or greater is applied to the front of the vehicle. Therefore, an outstanding advantage is offered in that the displacement of the stepping surface of the pedal for a vehicle can be controlled when the external force of a predetermined value or greater is applied from the forward direction of the vehicle.

In addition, in the present invention, since the pedal bracket is coupled to the first vehicle body-side component member in such a manner as to be rotatable about the front end side thereof substantially in the vertical direction of the vehicle, it is possible to obtain an outstanding advantage in that the reaction against the downward displacement acting on the guiding means from the rear end side of the pedal bracket becomes small, thereby making it possible to displace the rear end side of the pedal bracket smoothly about the front end side thereof substantially toward the lower side of the vehicle.

The structure for controlling the displacement of a pedal for a vehicle in accordance with the second aspect of the invention is arranged such that, in the first aspect of the invention, the length of the segment which connects the rotating shaft portion and the point of coupling of the front end side of the pedal bracket to the first vehicle body-side component member is set to be longer than the length of rotation of transmitting means which is coupled to a vicinity of an intermediate portion of the pedal for a vehicle and is adapted to transmit a stepping force imparted to the stepping surface of the pedal for a vehicle to the master cylinder for conversion to hydraulic pressure. Therefore, an outstanding advantage is offered in that it is possible to increase the distance in the substantially longitudinal direction of the vehicle between the rotating shaft portion and the point of coupling of the transmitting means to the pedal for a vehicle, thereby making it possible to increase the amount of rotative displacement of the pedal bracket substantially toward the front side of the vehicle (in turn, the amount of rotative displacement of the stepping surface of the pedal for a vehicle substantially toward the front side of the vehicle).

The structure for controlling the displacement of a pedal for a vehicle in accordance with the third aspect of the invention is arranged such that, in the first or second aspect of the invention, the segment which connects the rotating shaft portion and the point of coupling of the front end side of the pedal bracket to the first vehicle body-side component member is set to be inclined substantially toward the lower side of the vehicle in a direction substantially toward the front side of the vehicle with respect to the transmitting means. Therefore, an outstanding advantage is offered in that it is possible to increase the distance in the substantially longitudinal direction of the vehicle between the rotating shaft portion and the point of coupling of the transmitting means to the pedal for a vehicle, thereby making it possible to increase the amount of rotative displacement of the pedal bracket substantially toward the front side of the vehicle (in turn, the amount of rotative displacement of the stepping surface of the pedal for a vehicle substantially toward the front side of the vehicle).

The structure for controlling the displacement of a pedal for a vehicle in accordance with the fourth aspect of the invention is arranged such that, in any one of the first to third aspects of the invention, the urging means is provided for urging the rear end side of the pedal bracket in a direction in which the rear end side of the pedal bracket receives a displacing force oriented substantially toward the lower side of the vehicle. Therefore, it is possible to obtain an outstanding advantage in that the reaction against the downward displacement acting on the guiding means from the rear end side of the pedal bracket becomes even smaller than in the case of the first aspect of the invention, thereby making it possible to displace the rear end side of the pedal bracket very smoothly about the front end side thereof substantially toward the lower side of the vehicle.

The above and other objects, features and advantages of the present invention will become more apparent from the following detailed description of the invention when read in conjunction with the accompanying drawings.

BRIEF DESCRIPTION OF THE DRAWINGS

FIG. 2 is a schematic diagram of the structure shown in FIG. 1;

FIG. 3 is an enlarged perspective view of an arrangement for disengagement of a slide bracket from a slide plate shown in FIG. 1;

FIG. 5 is a schematic diagram explaining another example of application (inclined link mode) using the structure shown in FIG. 1;

FIG. 12 is a perspective view illustrating a conventional structure.

DESCRIPTION OF THE PREFERRED EMBODIMENTS

First Embodiment

Referring now to FIGS. 1 through 7, a description will be given of a first embodiment of the present invention.

Figure 1:
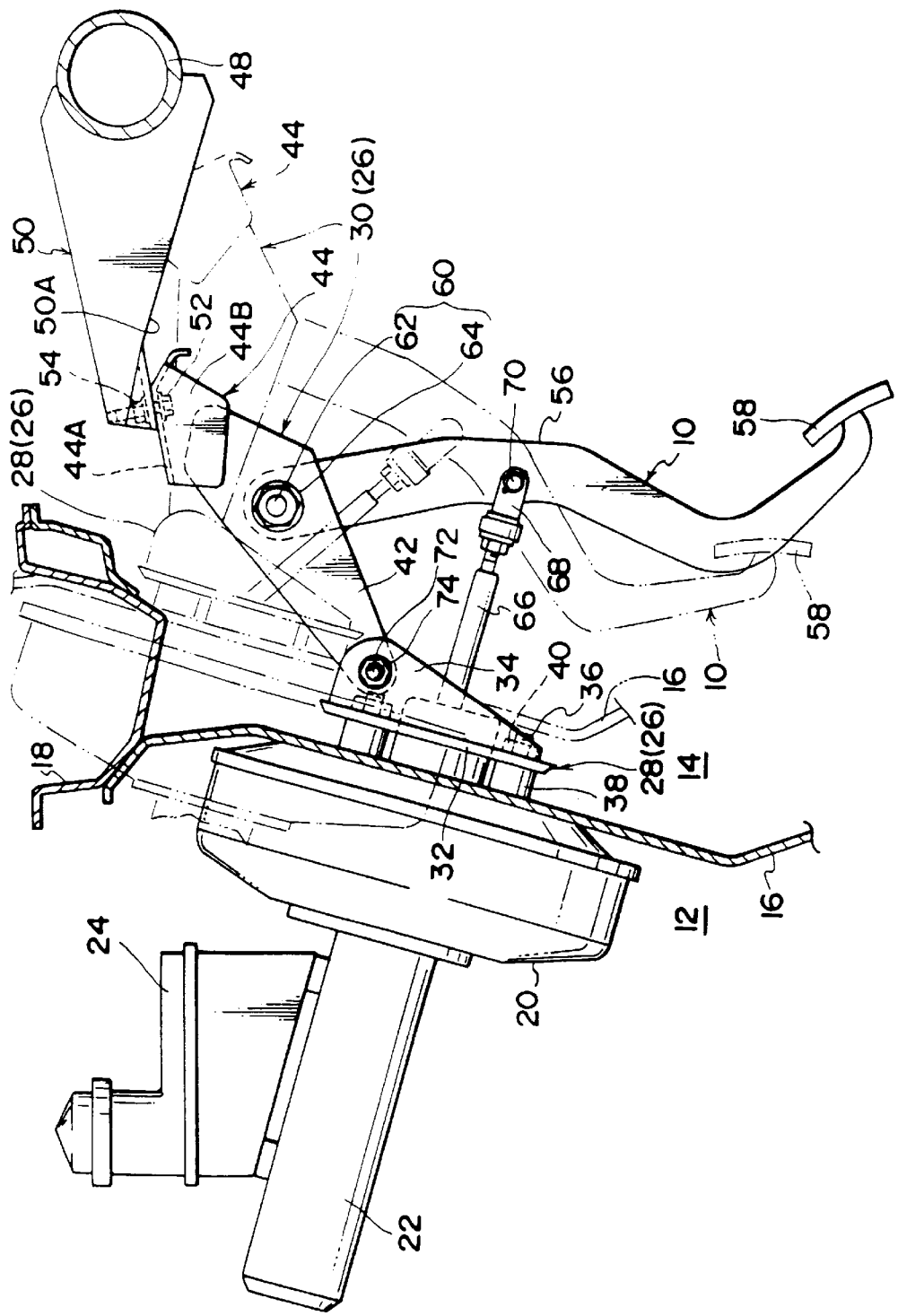
FIG. 1 is a side elevational view illustrating an overall configuration of a structure for controlling the displacement of a brake pedal for a vehicle in accordance with a first embodiment of the present invention.

In FIG. 1, the structure for controlling the displacement of a brake pedal 10 in accordance with this embodiment is shown in a side view. As shown in the drawing, a dash panel 16 is disposed substantially vertically at a position which partitions an engine room 12 from a vehicle compartment interior space 14. An upper end portion of the dash panel 16 is secured by spot welding or the like to the front side of a cowl inner panel 18 constituting a part of a cowl and arranged with its longitudinal direction set in the transverse direction of the vehicle. A lower end portion of the dash panel 16 is secured to an unillustrated floor panel by spot welding or the like.

Disposed integrally on the front side of the aforementioned dash panel 16 are a brake booster 20 functioning as a stepping-force boosting means for boosting the stepping force of a driver which is applied to the brake pedal 10, a master cylinder 22 for converting the pressure boosted by the brake booster 20 to hydraulic pressure, and a reservoir tank 24 for storing and replenishing a brake fluid while following a change in the volume of a hydraulic system.

Meanwhile, the brake pedal 10 serving as a pedal for a vehicle which is supported by a pedal bracket 26, which will be described later in detail, is disposed on the rear side of the dash panel 16. The brake pedal 10 is comprised of a pedal supporting portion 56 formed by appropriately bending a narrow plate material and a pedal pad 58 which is provided at a lower end of the pedal supporting portion 56 and serves as a stepping surface to which the stepping force of the driver is imparted. It should be noted that an unillustrated return spring is retained at the pedal supporting portion 56 of the brake pedal 10, thereby constantly urging the brake pedal 10 in a direction in which the brake pedal 10 returns to its initial position.

A rotating shaft portion 60 serving as a center of swinging motion is provided at an upper end portion of the pedal supporting portion 56 of the brake pedal 10. To give a brief description of an example of the configuration of the rotating shaft portion 60, the rotating shaft portion 60 is arranged as follows. A substantially tubular pedal boss is inserted into a through hole formed in an upper end portion of the pedal supporting portion 56, and hollow cylindrical bushes are respectively fitted over both end portions of the pedal boss. After tubular collars are fitted in the bushes, a mounting bolt 62 is inserted from the outer side of the pedal bracket 26, while a nut 64 is threadedly engaged with the mounting bolt 62 via a washer.

Further, a distal end portion of a push rod (i.e., an operating rod) 66, which serves as a transmitting means projecting from the brake booster 20 and penetrating through the dash panel 16, is connected to an intermediate portion of the pedal supporting portion 56 of the brake pedal 10. Specifically, a clevis 68, which has a substantially U-shaped cross section, is attached to a distal end of the push rod 66. The intermediate portion of the pedal supporting portion 56 is positioned between two side portions of the clevis 68 in an inserted state. In this state, a clevis pin 70 is passed through the two side portions of the clevis 68 and the pedal supporting portion 56, and a β-pin, a retaining ring or the like is provided on its penetrated end portion to retain the clevis pin 70 in position. Thus, the push rod 66 and the pedal supporting portion 56 are connected to each other in such a manner as to be rotatable relative to each other.

Next, a detailed description will be given of the arrangement of the pedal bracket 26 for swingably supporting the above-described brake pedal 10.

The pedal bracket 26 is split into a front bracket 28 and a rear bracket 30. The front bracket 28 is comprised of a base plate portion 32 constituting a surface for mounting on the dash panel 16, and a pair of front side portions 34 extending parallel to each other from opposite sides of the base plate portion 32 substantially toward the rear side of the vehicle. Thus, the pedal bracket 26 as a whole is formed substantially in a U-shape in a plan view.

Tubular collars 38 for allowing stud bolts 36 projecting from the brake booster 20 to be passed therethrough are secured to four corners of the front surface of the base plate portion 32. In a state in which these collars 38 are abutted against the dash panel 16, nuts 40 are respectively engaged threadedly on the stud bolts 36 passed through the base plate portion 32, thereby fixing the base plate portion 32 to the dash panel 16. As a result, the front bracket 28 is coupled to the dash panel 16. Alternatively, an arrangement may be provided such that weld nuts are welded in advance to the front surface of the dash panel 16, and mounting bolts are screwed into the weld nuts from the base plate portion 32 side and are fixed thereto. Further, an unillustrated used as a sound insulator is interposed between the dash panel 16 and the base plate portion 32. The aforementioned front bracket 28 constitutes one side of the split pedal bracket 26, but the front bracket 28, when installed by being coupled to the dash panel 16, is a component part which also functions as a component part of the dash panel 16 side in terms of the strength. Accordingly, the dash panel 16 and the front bracket 28 correspond to the "first vehicle body-side component member" in accordance with the present invention.

On the other hand, the rear bracket 30 disposed on the rear side of the front bracket 28 is comprised of a pair of rear side portions 42 for pivotally supporting the rotating shaft portion 60 of the brake pedal 10, and a rear top portion (not shown) connecting upper ends of the rear side portions 42. Thus, the rear bracket 30 as a whole is formed substantially in a U-shape. The distance between the pair of rear side portions 42 is set such that front end portions of the rear side portions 42 are disposed on the inner sides of the pair of front side portions 34.

Further, a slide bracket 44, which is comprised of a top wall 44A and opposite side walls 44B and has a substantially U-shaped cross section, is secured to a rear end of the rear bracket 30 by welding or the like in a state of being partially superposed thereon. Accordingly, the slide bracket 44 is formed integrally with the rear bracket 30, and these two members together constitute the "pedal bracket" in the present invention.

As shown in FIG. 3, a slit 46 which functions as a disengaging means is formed in the top wall 44A of the slide bracket 44. The slit 46 is comprised of a narrow portion 46A whose opening is narrow and a wide portion 46B which communicates with the narrow portion 46A and whose opening is wide. A front end portion of a slide plate 50, which is disposed projecting from an instrument panel reinforcement 48 substantially toward the front side of the vehicle, is disposed immediately above the aforementioned slide bracket 44. It should be noted that the instrument panel reinforcement 48 is a high-strength member which is arranged with its longitudinal direction set in the transverse direction of the vehicle, and the strength of the slide plate 50 is also set to a predetermined high level. The instrument panel reinforcement 48 and the slide plate 50 together function as the "second vehicle body-side component member" in accordance with the present invention. Then, a fixing bolt 52 is inserted through the narrow portion 46A of the slit 46 and the front end portion of the slide plate 50 from the reverse surface side of the top wall 44A of the slide bracket 44, and is threadedly engaged with a nut 54, thereby coupling the rear end side (i.e., the slide bracket 44) of the rear bracket 30 to the slide plate 50.

Further, the widthwise dimension of the opening in the narrow portion 46A of the aforementioned slit 46 is set to be slightly larger than the diameter of the shank portion of the fixing bolt 52 but smaller than the diameter of the head thereof, while the widthwise dimension of the opening in the wide portion 46B is set to be larger than the diameter of the head. Accordingly, when the fixing bolt 52 is located in the narrow portion 46A which is its assembled position, the rear end side of the rear bracket 30 maintains a state in which it is coupled to the slide plate 50. However, when the rear bracket 30 is displaced substantially toward the rear side of the vehicle and the fixing bolt 52 is relatively positioned in the wide portion 46B, the rear end side of the rear bracket 30 can be disengaged from the slide plate 50. Further, a lower end surface of the slide plate 50 is inclined at a predetermined angle substantially toward the lower side of the vehicle, and this inclined surface 50A is used as a sliding and guiding surface (guiding means) with respect to the top wall 44A of the slide bracket 44 secured to the rear bracket 30.

The front bracket 28 and the rear bracket 30 are coupled to each other by means of a hinge bolt 72 and a nut 74. Specifically, upper end portions of the front side portions 34 and front end portions of the rear side portions 42 are fitted to each other in a superposed manner, and the hinge bolt 72, which is a stepped bolt, is inserted in this state, while the nut 74 is threadedly engaged therewith, thereby allowing the rear bracket 30 to be hinge-coupled to the front bracket 28. Accordingly, the rear bracket 30 is rotatable about the hinge bolt 72 at its front end side in a substantially vertical direction of the vehicle (see FIG. 2 which schematically illustrates the arrangement shown in FIG. 1). However, since the rear end side of the rear bracket 30 is coupled to the slide plate 50 by means of the slide bracket 44, the rear bracket 30 does not undergo rotation relative to the front bracket 28 unless an external force of a predetermined value or greater is applied thereto from the forward direction of the vehicle.

It should be noted that it is not essential to use the hinge means based on the hinge bolt 72 and the nut 74, and it is possible to use other hinge means based on a rivet or the like.

Next, a description will be given of the operation and advantages of this embodiment.

As shown by solid lines in FIG. 1, when the brake pedal 10 is not operated, the brake pedal 10 is held at its initial position by the urging force of the return spring. In this state, if the driver steps down on the pedal pad 58 of the brake pedal 10, the brake pedal 10 is swung about the rotating shaft portion 60 substantially toward the front side of the vehicle, and the push rod 66 is pressed in the same direction. As a result, the stepping force applied to the pedal pad 58 by the driver is boosted by the brake booster 20, and is then converted to hydraulic pressure by the master cylinder 22.

Meanwhile, at the time that an external force of a predetermined value or greater is applied from the forward direction of the vehicle, the load occurring at that time is inputted to the dash panel 16 via the master cylinder 22 and the brake booster 20. For this reason, as shown by the two-dotted dash lines in FIG. 2, the dash panel 16 may be displaced substantially toward the rear side of the vehicle (and substantially toward the upper side of the vehicle).

In this case, the load acting substantially toward the rear side of the vehicle is inputted to the pedal bracket 26 in conjunction with the rearward displacement of the dash panel 16. However, since the slide plate 50, to which the rear end side (i.e., the slide bracket 44) of the pedal bracket 26 is coupled, as well as the instrument panel reinforcement 48, i.e., a member to which the slide plate 50 is mounted, are both high-strength members, the slide plate 50 and the instrument panel reinforcement 48 are practically not displaced substantially toward the rear side of the vehicle. For this reason, a relatively large load acting substantially toward the rear side of the vehicle is applied to the slide bracket 44, so that the slide bracket 44 slightly slides along the slide plate 50 substantially toward the rear side of the vehicle. Accordingly, the fixing bolt 52 which was positioned in the narrow portion 46A of the slit 46 is relatively positioned in the wide portion 46B of the slit 46. As a result, the head of the fixing bolt 52 is withdrawn from the wide portion 46B of the slit 46, allowing the slide bracket 44 to be disengaged from the slide plate 50.

When the slide bracket 44 is disengaged, the slide bracket 44 slides along the inclined surface 50A of the slide plate 50 substantially toward the rear side of the vehicle and substantially toward the lower side of the vehicle while displacing the rear bracket 30 about the hinge bolt 72 substantially toward the lower side of the vehicle, as shown by the two-dotted dash lines in FIG. 1. Consequently, the rear bracket 30 is rotatively displaced about the hinge bolt 72 substantially toward the front side of the vehicle. Accordingly, the pedal pad 58 of the brake pedal 10 supported by the rear bracket 30 is also displaced substantially toward the front side of the vehicle. In other words, in accordance with this embodiment, when an external force of a predetermined value or greater is applied from the forward direction of the vehicle, it is possible to provide control such that the pedal pad 58 of the brake pedal 10 is displaced by a large degree substantially toward the front side of the vehicle. As a result, it is possible to suppress the bending of the driver's knees due to the inertial movement of the driver when an external force of a predetermined value or greater is applied from the forward direction of the vehicle. In its turn, it is possible to keep the driver's knees away from the steering column.

The basic operation and advantages of this embodiment are described above, but it is possible to obtain the following additional advantage in accordance with this embodiment.

In this embodiment, since the pedal bracket 26 is divided into the front bracket 28 and the rear bracket 30, and the two members are hinge-coupled to each other, when the slide bracket 44 is disengaged from the slide plate 50, the rear bracket 30 becomes rotatable in the substantially vertical direction of the vehicle. For this reason, when the slide bracket 44 slides along the inclined surface 50A of the slide plate 50, the reaction against the downward displacement acting on the inclined surface 50A of the slide plate 50 from the slide bracket 44 becomes small. Accordingly, it is possible to allow the rear end side of the rear bracket 30 to be rotatively displaced smoothly about the hinge bolt 72 substantially toward the lower side of the vehicle.

As described above, since the rear end side of the rear bracket 30 is disengaged from the slide plate 50 when an external force of a predetermined value or greater is applied from the forward direction of the vehicle, and since the reaction against the downward displacement acting on the inclined surface 50A of the slide plate 50 from the slide bracket 44 becomes small, it is possible to prevent a relatively large load from being inputted to the instrument panel reinforcement 48 via the rear bracket 30, the slide bracket 44, and the slide plate 50.

Further, in this embodiment, since the pedal bracket 26 is divided into the front bracket 28 and the rear bracket 30, and the rear bracket 30 is hinge-coupled to the front bracket 28 so as to arrange the rear bracket 30 in such a manner as to be rotatable in the substantially vertical direction of the vehicle, the reaction force from the instrument panel reinforcement 48 substantially toward the front side of the vehicle is unnecessary which is otherwise required when an arrangement is adopted in which the pedal bracket is made to undergo rotative displacement by causing the pedal bracket to buckle in the substantially longitudinal direction of the vehicle. For this reason, the strength of the slide plate 50 can be designed to be low, so that it is possible to attain a reduction in weight and low cost.

Next, referring to FIGS. 4 to 7, a description will be given of a number of examples of application which are based on the above-described embodiment. It should be noted that, in these drawings, the brake pedal 10, the rear bracket 30, and the push rod 66 are considered as a quadric link mechanism and are schematically illustrated. Namely, if it is assumed that the center of rotation (hinge bolt 72) of the rear bracket 30 is a point A, the rotating shaft portion 60 of the brake pedal 10 is a point B, a supporting point of the push rod 66 on the brake booster side is a point C, and a point of coupling (clevis pin 70) of the push rod 66 to the brake pedal 10 is a point D, then a link P which connects the points A and B is considered as the rear bracket 30, a link Q which connects the points C and D is considered as the push rod 66, and a link R which connects the points B and D and leads to the pedal pad 58 is considered as the brake pedal 10.

Figure 4:
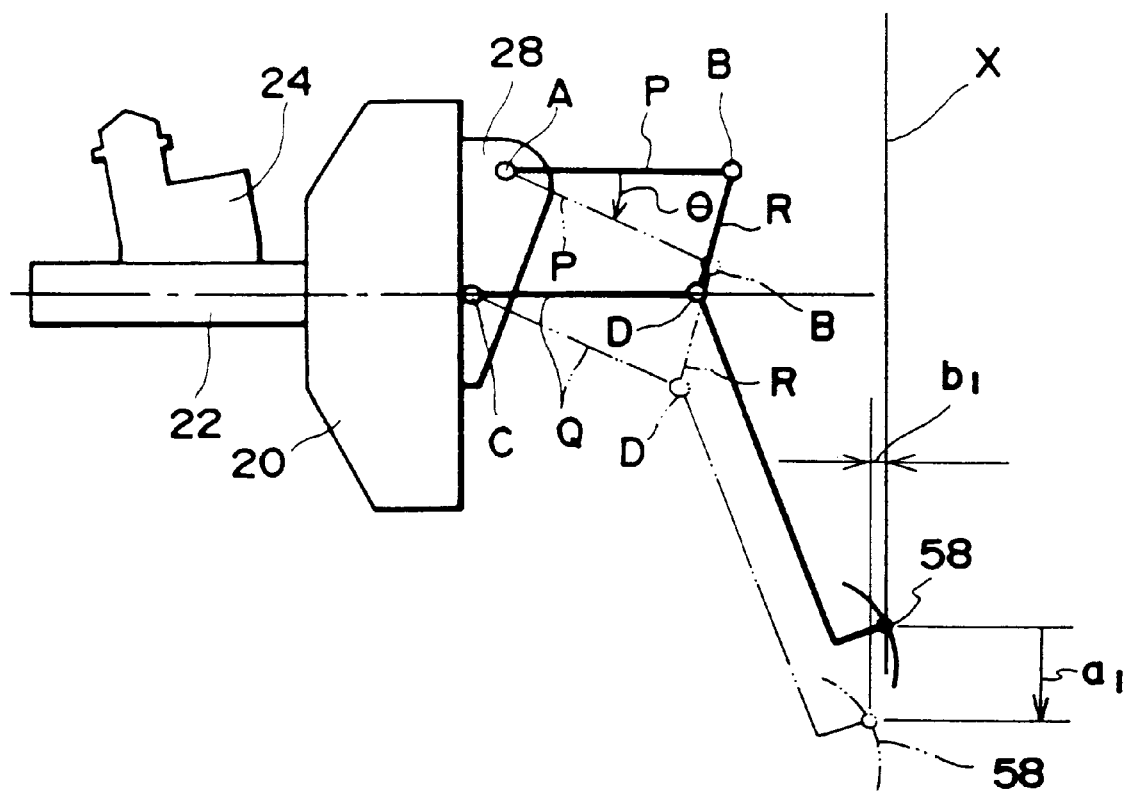
FIG. 4 is a schematic diagram explaining an example of application (standard mode) using the structure shown in FIG. 1.

The example shown in FIG. 4 shows a standard mode. Namely, this example shows a case in which the link P and the link Q are of equal length and parallel. Incidentally, it is assumed that, in the state before application of an external force of a predetermined value or greater from the front of the vehicle, the longitudinal position of the pedal pad 58 is on a line X. In this case, if it is assumed that an external force of a predetermined value or greater has been applied from the forward direction of the vehicle, and that the link P has undergone rotative displacement substantially toward the lower side of the vehicle by an angle of rotation $\theta$, then the pedal pad 58 is displaced from the position indicated by the solid lines to the position indicated by the two-dotted dash lines. Accordingly, the amount of displacement of the pedal pad 58 substantially toward the lower side of the vehicle becomes $a_1$, and the amount of displacement thereof substantially toward the front side of the vehicle becomes $b_1$.

The example of application shown in FIG. 5 shows an inclined link mode. Namely, this example of application is characterized in that the lengths of the link P and the link Q are kept equal, but the link P is inclined by an angle $\phi$ with respect to the link Q. It should be noted that the direction of inclination of the link P is set in the direction in which the link P is inclined substantially toward the lower side of the vehicle in a direction substantially toward the front side of the vehicle (i.e., in the direction in which the link P is inclined by causing the point A to approach the link Q relative to the point B). In this case, if it is assumed that an external force of a predetermined value or greater has been applied from the forward direction of the vehicle, and that the link P has undergone rotative displacement substantially toward the lower side of the vehicle by the angle of rotation θ, then the pedal pad 58 is displaced from the position indicated by the solid lines to the position which is indicated by the two-dotted dash lines and is located more substantially on the vehicle front side than in the case of FIG. 4. This is because the distance c in the substantially longitudinal direction of the vehicle between the point D, i.e., a connecting point between the links Q and R, and the point B, i.e., the swinging center of the link R, increases more than in the case shown in FIG. 4 (i.e., the points D and B become spaced apart from each other by a greater distance in the substantially longitudinal direction of the vehicle) due to the fact that the center of rotation of the link P is offset substantially toward the lower side of the vehicle (toward the link Q). Accordingly, the amount of displacement of the pedal pad 58 substantially toward the lower side of the vehicle becomes $a_2$ which is greater than $a_1$, while the amount of displacement thereof substantially toward the front side of the vehicle becomes $b_2$ which is greater than $b_1$. It should be noted that the "segment which connects a point of coupling of the front end side of the pedal bracket to the first vehicle body-side component member and the rotating shaft portion" in the present invention means the link P.

Figure 6:
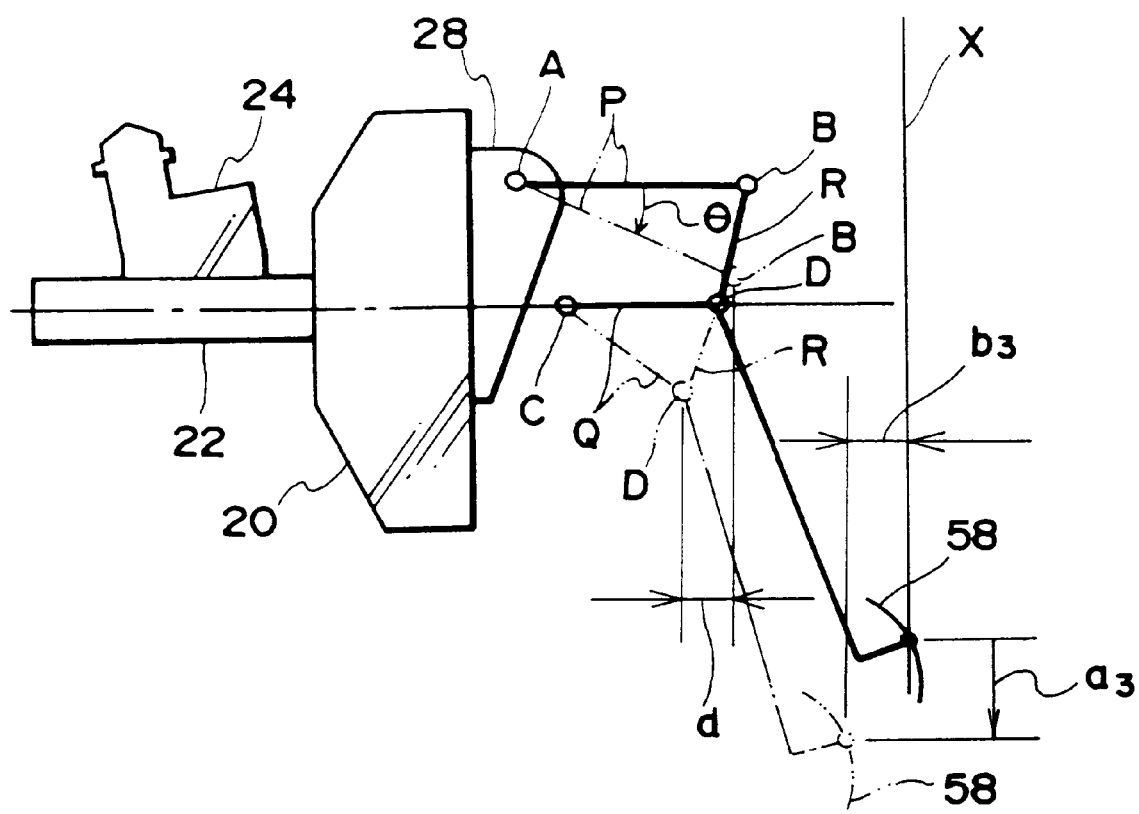
FIG. 6 is a schematic diagram explaining still another example of application (unequal-length link mode) using the structure shown in FIG. 1.

The example of application shown in FIG. 6 shows an unequal-length link mode. That is, this example of application is characterized in that the length of the link P is set to be greater than the length of the link Q. It should be noted that since this drawing is a schematic diagram the point C, i.e., the center of rotation of the link Q, is illustrated as being spaced apart from the front bracket 28. In this case, if it is assumed that an external force of a predetermined value or greater has been applied from the forward direction of the vehicle, and that the link P has undergone rotative displacement substantially toward the lower side of the vehicle by the angle of rotation θ, then the pedal pad 58 is displaced from the position indicated by the solid lines to the position which is indicated by the two-dotted dash lines and is located more substantially on the vehicle front side than in the case of FIG. 4. This is because the distance d in the substantially longitudinal direction of the vehicle between the point D, i.e., the connecting point between the links Q and R, and the point B, i.e., the swinging center of the link R, increases more than in the case shown in FIG. 4 (i.e., the points D and B become spaced apart from each other by a greater distance in the substantially longitudinal direction of the vehicle) due to the fact that the link Q is shorter than the link P and the radius of rotation of the link Q is smaller by that portion. Accordingly, the amount of displacement of the pedal pad 58 substantially toward the lower side of the vehicle becomes $a_3$ which is greater than $a_1$, while the amount of displacement thereof substantially toward the front side of the vehicle becomes $b_3$ which is greater than $b_1$.

It should be noted that the "length of a segment which connects a point of coupling of the front end side of the pedal bracket to the first vehicle body-side component member and the rotating shaft portion" and the "length of rotation of the transmitting means" mean the length of the link P and the length of the link Q, respectively.

Further, to give a complementary explanation concerning the "length of rotation of the transmitting means," the link Q does not necessarily mean the transmitting means itself, but means the length of a portion which rotates when the transmitting means receives a displacement force acting substantially toward the lower side of the vehicle. For example, in the case of a transmitting means which is arranged to be bent midway, the relevant length means the length from that bending point to the point of coupling to the pedal for a vehicle.

Figure 7:
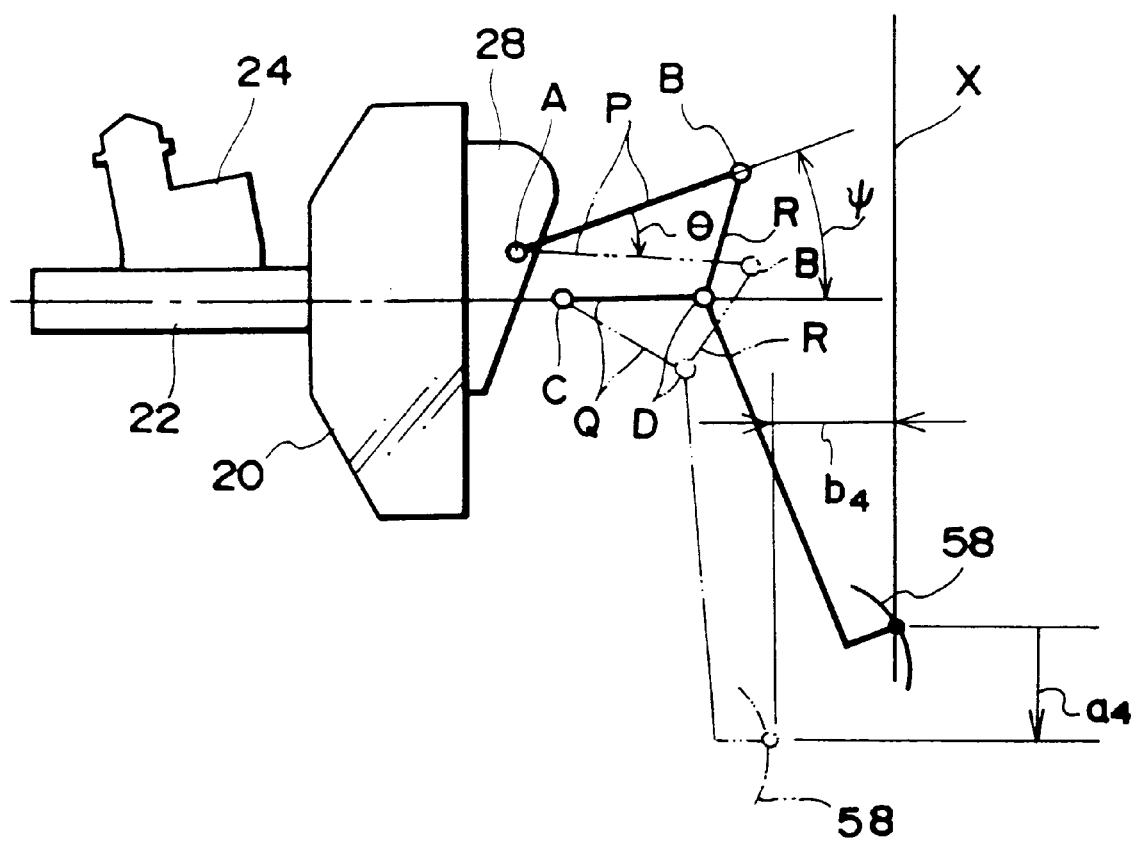
FIG. 7 is a schematic diagram explaining a further example of application (combination mode) using the structure shown in FIG. 1.

The example of application shown in FIG. 7 shows a combination mode. Namely, this example of application is characterized in that the example of application shown in FIG. 5 and the example of application shown in FIG. 6 are combined. That is, the characteristic feature lies in that the length of the link P is set to be greater than the length of the link Q, and that the link P is inclined by an angle φ with respect to the link Q. In this case, if it is assumed that an external force of a predetermined value or greater has been applied from the forward direction of the vehicle, and that the link P has undergone rotative displacement substantially toward the lower side of the vehicle by the angle of rotation θ, then the pedal pad 58 is displaced from the position indicated by the solid lines to the position which is indicated by the two-dotted dash lines and is located more substantially on the vehicle front side than in the case of FIGS. 5 and 6. This is because, due to the combination of the mechanism of forward displacement of the pedal pad 58 shown in FIG. 5 and the mechanism of forward displacement of the pedal pad 58 shown in FIG. 6, the effect of forward displacement of the pedal pad 58 is obtained as a synergistic effect of the two mechanisms. Accordingly, the amount of displacement of the pedal pad 58 substantially toward the lower side of the vehicle becomes $a_4$ which is greater than $a_2$ and $a_3$, while the amount of displacement thereof substantially toward the front side of the vehicle becomes $b_4$ which is greater than $b_2$ and $b_3$.

Second Embodiment

Next, referring to FIGS. 8 and 9, a description will be given of a second embodiment of the present invention. In the drawings, those component parts that are identical to those of the above-described first embodiment will be denoted by the same reference numerals, and a description thereof will be omitted.

Figure 8:
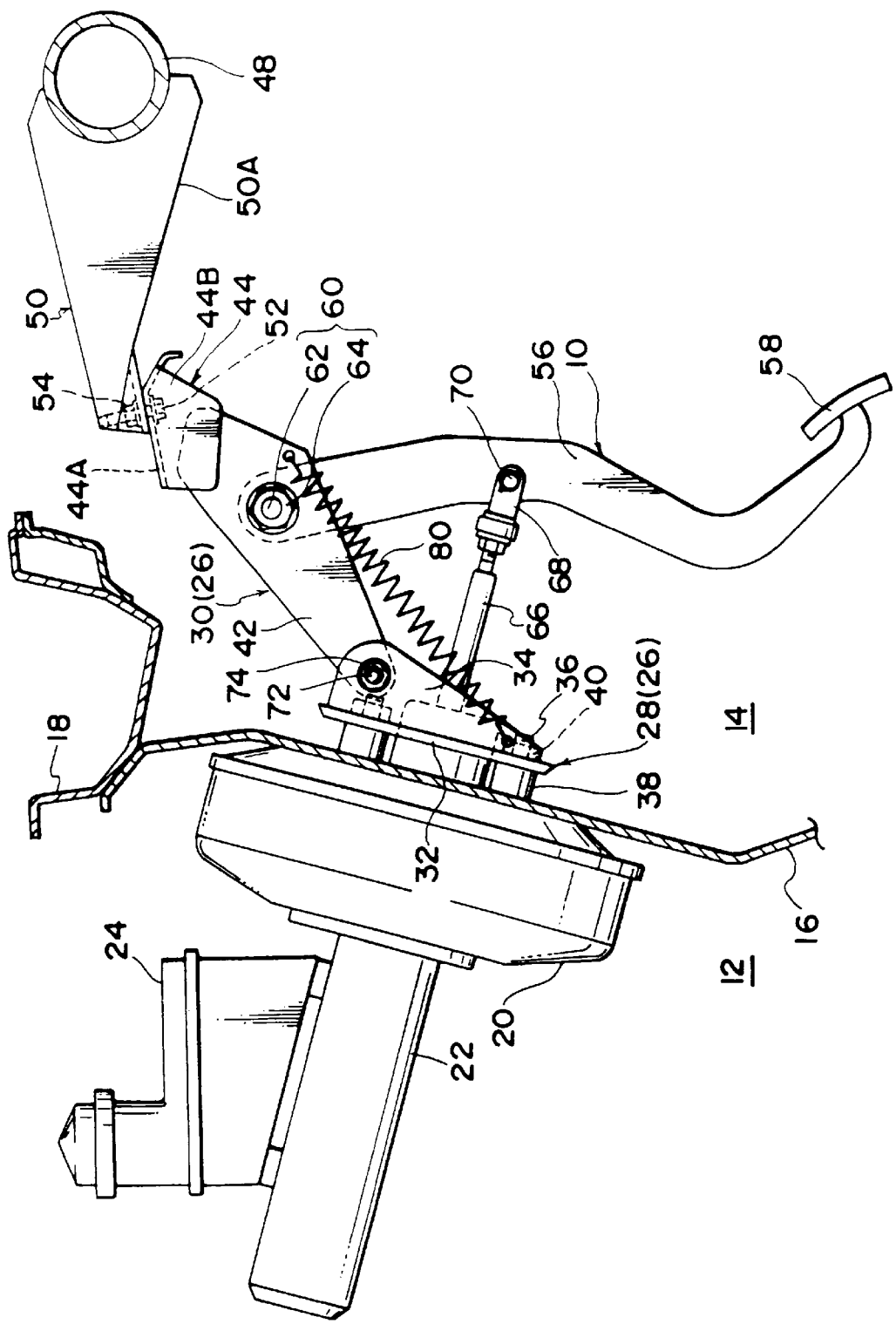
FIG. 8 is a side elevational view illustrating an overall configuration of a structure for controlling the displacement of a brake pedal for a vehicle (extension coil spring type) in accordance with a second embodiment of the present invention.

The embodiment shown in FIG. 8 is characterized in that an extension coil spring 80 serving as an urging means is stretched between a lower end portion of the front side portion 34 in the front bracket 28 and a rear end portion of the rear side portion 42 in the rear bracket 30. As a result, the rear end side of the rear bracket 30 is constantly urged in the direction in which the rear end side of the rear bracket 30 receives a displacing force for displacing it about the hinge bolt 72 substantially toward the lower side of the vehicle.

In accordance with the above-described arrangement, when an external force of a predetermined value or greater is applied from the forward direction of the vehicle, and the slide bracket 44 which is the rear end side of the rear bracket 30 is disengaged from the slide plate 50, the rear end side of the rear bracket 30 is easily displaced rotatively about the hinge bolt 72 substantially toward the lower side of the vehicle by the urging force of the extension coil spring 80. For this reason, the reaction against the downward displacement acting on the slide plate 50 from the rear end side (slide bracket 44) of the rear bracket 30 becomes even smaller. Therefore, the rear end side of the rear bracket 30 can be displaced very smoothly about the hinge bolt 72 substantially toward the lower side of the vehicle.

Figure 9:
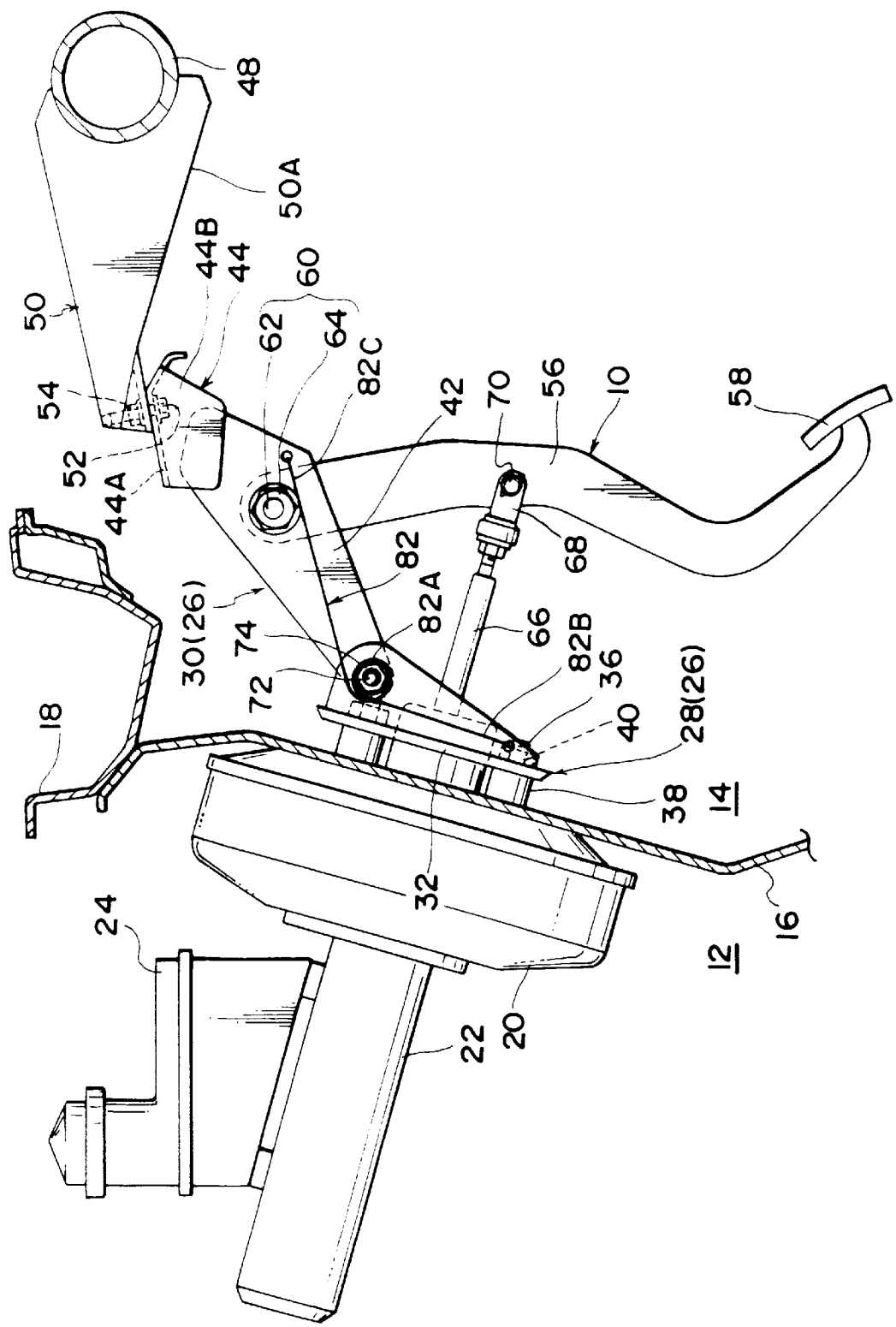
FIG. 9 is a side elevational corresponding to FIG. 8 and illustrating the embodiment using a torsion spring instead of the extension coil spring.

In addition, the embodiment shown in FIG. 9 is characterized in that a torsion spring 82 is used instead of the aforementioned extension coil spring 80.

Specifically, a coil portion 82A of the torsion spring 82 is wound around an end portion of the hinge bolt 72 which hinge-couples the front bracket 28 and the rear bracket 30, and one end portion 82B of the torsion spring 82 is retained at a lower end portion of the front side portion 34, while another end portion 82C thereof is retained at a rear end portion of the rear side portion 42. Incidentally, the state in which an included angle formed by the end portion 82B and the other end portion 82C has become narrower by a predetermined angle than in the state shown in FIG. 9 is the free state of the torsion spring 82. Hence, the rear end side of the rear bracket 30 is constantly urged in the direction in which the rear end side of the rear bracket 30 receives a displacing force for displacing it about the hinge bolt 72 substantially toward the lower side of the vehicle.

In accordance with the above-described arrangement as well, it is possible to obtain operation and advantages similar to those in the case where the aforementioned extension coil spring 80 is used.

It should be noted that although, in the above-described embodiment, the extension coil spring 80 or the torsion spring 82 is used, the present invention is not limited to the same, and it is possible to use any urging means insofar as it is capable of imparting a displacing force acting substantially toward the lower side of the vehicle to the rear end side of the rear bracket 30.

Third Embodiment

Figure 10:
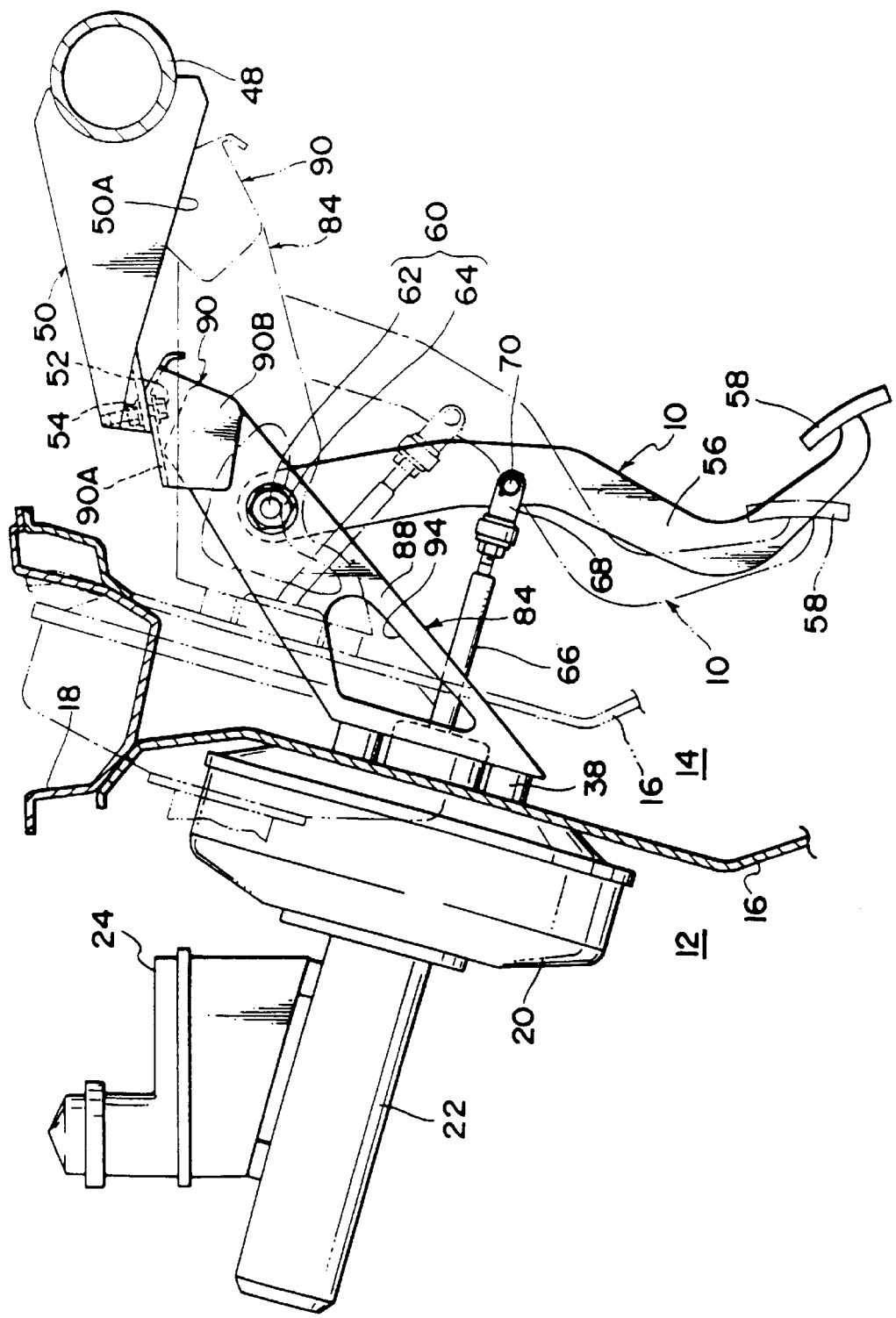
FIG. 10 is a side elevational view illustrating an overall configuration of a structure for controlling the displacement of a brake pedal for a vehicle in accordance with a third embodiment of the present invention.
Figure 11:
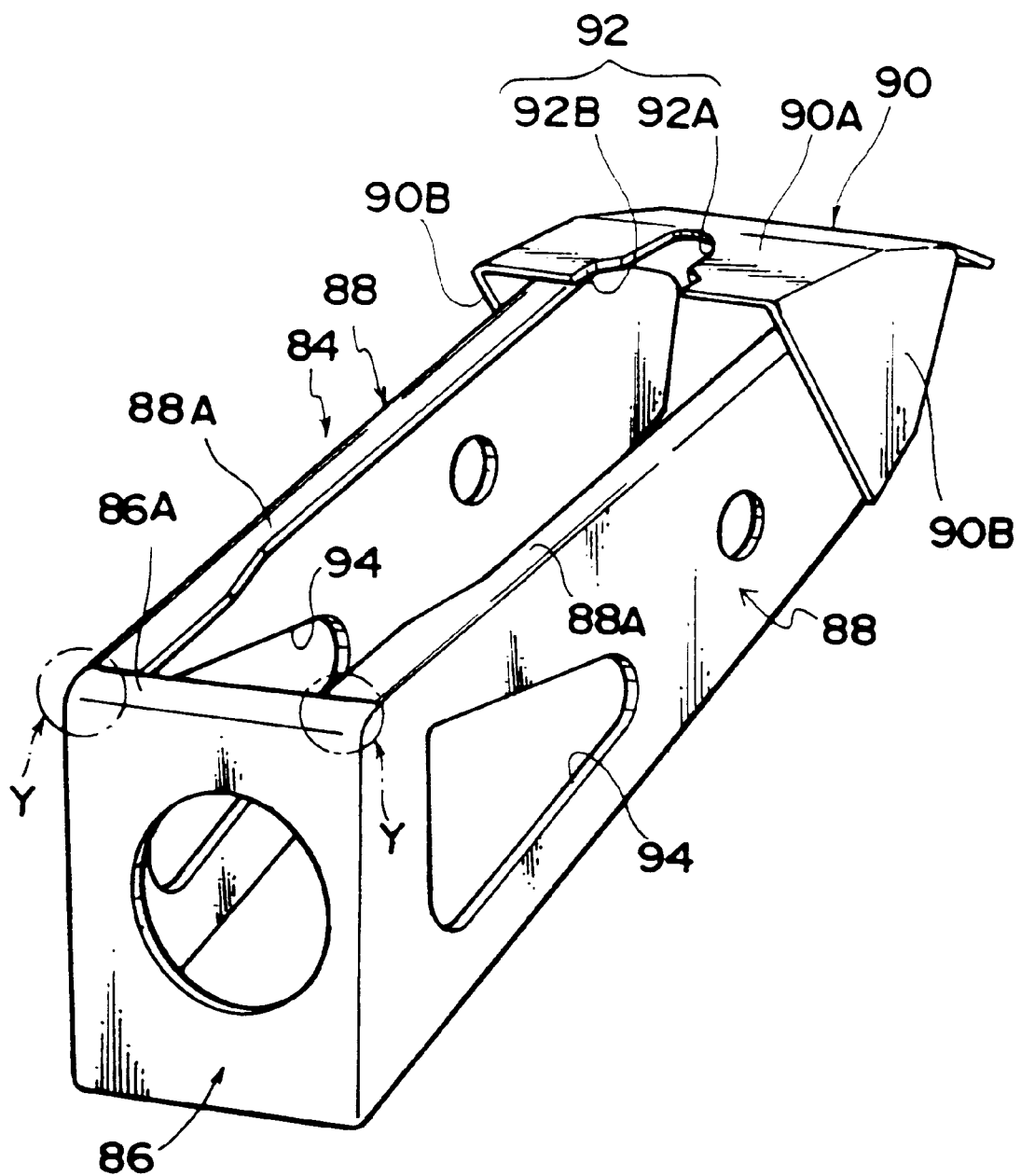
FIG. 11 is an enlarged perspective view of a pedal bracket shown FIG. 10.

Next, referring to FIGS. 10 and 11, a description will be given of a third embodiment of the present invention. In the drawings, those component parts that are identical to those of the above-described first embodiment will be denoted by the same reference numerals, and a description thereof will be omitted.

This embodiment is characterized in that the hinge mechanism in the first embodiment is realized by making use of plastic deformation of a pedal bracket 84. As shown in FIG. 11, in particular, the pedal bracket 84 is comprised of a base plate portion 86 constituting a surface for mounting on the dash panel 16, and a pair of side portions 88 which are bent at opposite side portions of the base plate portion 86 and extend parallel to each other substantially toward the rear side of the vehicle. In addition, a slide bracket 90 comprised of a top wall 90A and opposite side walls 90B is secured to rear end portions of the pair of side plate portions 88. A slit 92 (functioning as a disengaging means) which is comprised of a narrow portion 92A and a wide portion 92B is formed in the top wall 90A.

An opening 94 of a predetermined configuration is formed in a front end side of each of the pair of side plate portions 88. As a result, the rigidity of the front end sides of the side plate portions 88 with respect to the substantially longitudinal direction of the vehicle is set to be low. Further, flange portions 88A which are respectively bent in mutually approaching directions are formed at upper edges of the side plate portions 88. Consequently, the rigidity of the upper edges of the side plate portions 88 with respect to the substantially longitudinal direction of the vehicle is set to be high. However, the flange portions 88A are not formed at upper edge portions of front end portions of the side plate portions 88, and another flange portion 86A, which is formed by bending an upper edge of the base plate portion 86, is disposed at these portions. Accordingly, the upper edge portions (encircled portions indicated by arrow Y in FIG. 11) of the side plate portions 88 in the pedal bracket 84 are made weak, so that as the front end side of the pedal bracket 84 undergoes plastic deformation, the rear end side of the pedal bracket 84 can be rotatively displaced substantially toward the lower side of the vehicle. Namely, these encircled portions indicated by arrow Y function as the aforementioned hinge.

In accordance with the above-described arrangement, the openings 94 are formed in the front end sides of the side plate portions 88 of the pedal bracket 84 so as to lower the longitudinal rigidity of the front end sides of the side plate portions 88, the flange portions 88A are formed for enhancing the longitudinal rigidity of the upper edges of the side plate portions 88, and the flange portions 88A are not formed at the encircled portions indicated by arrow Y so as to impart the function of a hinge. Accordingly, when an external force of a predetermined value or greater is applied from the forward direction of the vehicle, as the front end side of the pedal bracket 84 undergoes plastic deformation, the encircled portions indicated by arrow Y in the pedal bracket 84 function as the hinge, so that the rear end side of the pedal bracket 84 is rotatively displaced substantially toward the lower side of the vehicle, as indicated by the two-dotted dash lines in FIG. 10. Accordingly, it is possible to obtain advantages similar to those of the above-described first embodiment. It should be noted that, by appropriately changing the configuration of the pedal bracket 84, any one of the modes shown in FIGS. 5 to 7 can be reproduced.

In the above-described embodiments, the present invention is applied with respect to a main brake pedal of a suspended type, but the present invention is not limited to the same and may be applied to a clutch pedal of a suspended type, or the like.

In addition, in the above-described embodiments, the arrangement provided is such that the slit 46 or 92 is formed in the slide bracket 44 or 90, and the slide bracket 44 or 90 is disengaged from the slide plate 50 by making use of the configuration of the slit 46 or 92. However, the present invention is not limited to the same, and it is possible to adopt any arrangement insofar as the rear end side of the pedal bracket 26 or 84 is disengaged from the slide plate 50 by the input of a load of a predetermined value or greater. For example, it is possible to adopt various arrangements including one in which the slide bracket 44 or 90 and the slide plate 50 are coupled to each other by spot welding or by a shear pin which is sheared by a load of a predetermined value or greater.

Furthermore, although in the above-described embodiments the arrangement adopted is such that the rear end side of the pedal bracket 26 or 84 is disengaged, it is not essential to adopt such an arrangement, and the present invention can be applied to a structure in which the rear end side of the pedal bracket is pressed from an upper direction and is displaced substantially toward the lower side of the vehicle.

What is claimed is:

1. A structure for controlling the displacement of a pedal for a vehicle that has a front side, a rear side and a lower side, comprising:

a first vehicle body-side component member which is displaced in a direction that includes a horizontal component that extends toward the rear side of the vehicle when an external force of at least a predetermined value is applied at the front side of the vehicle;

a second vehicle body-side component member which is disposed closer to the rear side of the vehicle than the first vehicle body-side component member and which substantially does not undergo displacement substantially toward the rear side of a vehicle when the external force is applied;

a pedal bracket having a front end side that is coupled to the first vehicle body-side component member, a rear end side that is coupled to the second vehicle body-side component member, and a substantially rearwardly facing surface at the rear end side;

a pedal for the vehicle having a rotating shaft portion serving as a center of swinging motion and which is supported by said pedal bracket, the pedal having a lower portion; and guiding means for causing at least the lower portion of said pedal to be rotatively displaced substantially toward the front side of the vehicle in a side view by causing at least the substantially rearwardly facing surface at the rear end side of said pedal bracket to be displaced in a direction that includes a vertical component that extends toward the lower side of the vehicle when the external force is applied, wherein said pedal bracket is coupled to the first vehicle body-side component member in such a manner as to be rotatable about the front end side of the pedal bracket, the pedal bracket being coupled to the first vehicle body-side component member via a cylindrical member so that the pedal bracket is rotatable about an axis of the cylindrical member relative to the first vehicle body-side component member.

2. A structure for controlling the displacement of a pedal for a vehicle according to claim 1, further comprising transmitting means for transmitting a stepping force imparted to a stepping surface of said pedal to a master cylinder of the vehicle for conversion to hydraulic pressure, the transmitting means being coupled to the pedal in a vicinity of an intermediate portion of the pedal, wherein the length of a segment which connects a point of coupling of the front end side of said pedal bracket to the first vehicle body-side component member and said rotating shaft portion is set to be longer than the length of the transmitting means.

3. A structure for controlling the displacement of a pedal for a vehicle according to claim 1, wherein a segment which connects a point of coupling of the front end side of said pedal bracket to the first vehicle body-side component member and said rotating shaft portion is set to be inclined substantially toward the lower side of the vehicle in a direction substantially toward the front side of the vehicle with respect to transmitting means, the transmitting means being coupled to the pedal in a vicinity of an intermediate portion of said pedal and being adapted for transmitting a stepping force imparted to a stepping surface of said pedal to a master cylinder of the vehicle for conversion to hydraulic pressure.

4. A structure for controlling the displacement of a pedal for a vehicle according to claim 1, wherein said guiding means has a sliding surface against which, when the external force is applied, the rear end side of said pedal bracket abuts and slides and by which the rear end side of said pedal bracket is guided in a substantially diagonally downward direction of the vehicle.

* * * * *